United States Patent Office 2,900,347
Patented Aug. 18, 1959

2,900,347

PROCESS FOR PREPARING COPPER LIQUOR FOR USE IN REMOVING CARBON OXIDES FROM AMMONIA SYNTHESIS GAS AND PRODUCT

Robert W. Foreman, Lyndhurst, Ohio, assignor to The Standard Oil Company, Cleveland, Ohio, a corporation of Ohio No Drawing. Application May 7, 1956
Serial No. 582,923

4 Claims. (Cl. 252—182)

This invention relates to a process for the preparation of copper liquor used in removing carbon monoxide and carbon dioxide from the hydrogen-nitrogen gas mixtures going to ammonia synthesis plants, and more particularly, to a process for the production of such copper liquor using a copper acetate "heel," and the copper liquor thereby obtained.

Synthetic ammonia is prepared by the reaction of hydrogen and nitrogen at 4500 to 5000 p.s.i.g. and a temperature of 900 to 1000° F., using an iron catalyst. The hydrogen and nitrogen are prepared by steam reforming of methane to yield carbon monoxide and hydrogen, and eliminating most of the residual methane by burning in air to produce carbon monoxide and water. This gas mixture is then shifted in the water gas equilibrium to produce a mixture consisting essentially of nitrogen, hydrogen and carbon dioxide, together with about 2% (20,000 parts per million) carbon monoxide, some unreacted methane and some argon.

The iron catalyst used in converting these gases to ammonia contains potassium oxide and aluminum oxide, and is very sensitive to poisoning by carbon monoxide. The hydrogen-nitrogen mixture going to the ammonia synthesis plant must have a carbon monoxide content of less than 50 parts per million to avoid poisoning. The carbon monoxide therefore must be removed before the synthesis gas is passed into contact with the catalyst.

In order to do this, the crude synthesis gas is compressed at about 270 p.s.i.g., passed to a purification system in which carbon dioxide is removed by water scrubbing at this pressure, and then to a scrubber using copper liquor at 1700 p.s.i.g. at about 40° F. In the scrubbing step carbon dioxide and carbon monoxide are removed down to about 5 parts per million.

This copper liquor is especially formulated for carbon monoxide removal, and contains about 115 to 125 g./l. of copper, composed of about 20 g./l. of cupric copper and 100 g./l. of cuprous copper, together with 7 to 12 g./l. of formic acid, 42 to 60 g./l. of acetic acid, about 145 g./l. of ammonia and 90 to 100 g./l. of carbon dioxide. This liquor is prepared by placing metallic copper, usually in the form of scrap wire, in a large vessel, to which is added the required amount of water. Ammonia then is pumped in, followed by formic and acetic acids in the proper quantities, and the fluid recirculated during the addition of air. The copper gradually is oxidized by air to form cupric oxide, which reacts with the ammonium formate and acetate to produce cupric ammonium formate and acetate. This in turn is reduced by the metallic copper to cuprous ammonium formate and acetate, effecting further solution of copper metal.

The solution process is quite slow, due to the slowness with which the metallic copper dissolves, and the preparation of the copper liquor accordingly requires two weeks or more. This is entirely too slow to be satisfactory for use as a commercial procedure.

In accordance with the invention, such copper liquor is prepared within less than 24 hours' time by use of a copper acetate "heel" in the initial preparation of the solution. The amount of copper, as copper acetate, added initially as the "heel" constitutes from about 1 to about 20% of the total copper content of the final solution. Either cuprous or cupric acetate or a mixture thereof can be used, since both cuprous and cupric ions are present in the copper liquor, and the term "copper acetate" is used generically in the specification and claims to refer to both. Cupric acetate is readily available, and would ordinarily be employed in view of the formation of cuprous ion in the solution of the metallic copper.

The copper acetates dissolve readily and rapidly in aqueous ammonia. Formic acid is not essential to the copper liquor, and need not be present in the copper liquor of the invention. The cuprous-cupric ratio, which is critical to carbon monoxide absorption, is readily controlled during preparation of the copper liquor of the invention with the use of cupric and/or cuprous acetate "heels."

The concentrations of cuprous and cupric copper, ammonia and acetic acid in the copper liquor of the invention are adjusted to meet the required CO and $CO_2$ absorptive capacities, the need to prevent free copper deposition, and the need to limit corrosivity of the liquor. These concentrations accordingly fall within a fairly narrow range. CO absorptive capacity increases as the cuprous concentration is increased, and also depends on the cuprous-cupric ratio. $CO_2$ absorptive capacity increases as ammonia content increases. Too low a cupric copper level results in deposition of metallic copper. The use of a high cupric acetate and ammonia content prevents corrosion due to the liquor. These considerations require that a copper liquor to be satisfactory have a cuprous-cupric ion ratio of about 4.5 to about 5, and a cupric concentration of about 10 to 30 g./l. with a total copper content of about 60 g. to 160 g./l. The ammonia content, calculated as $NH_3$, should approximate 50 to 145 g./l., and the acetic acid content, calculated as $CH_3COO^-$, 70 to 180 g./l. Formic acid is optional, and would be used in partial or complete replacement of acetic acid, in an amount calculated as $HCOO^-$, up to 145 g./l.

The order of mixing of the chemicals in the copper liquor of the invention is not critical. However, the procedure to be outlined and used in the working examples is recommended. In place of aqueous ammonia, the ammonia solution can be prepared in situ by bubbling ammonia gas into water.

The mixing procedure which is suggested involves addition of water and aqueous ammonia to a reservoir or mixing tank, followed by the addition of the acetic acid. This results in an appreciable temperature rise, due to heat of reaction and solution. Copper acetate in the amount desired then is dissolved in this mixture. Metallic copper is added in the form of copper wire, or copper shot, and air-blowing begun.

The reaction temperature at which the solution is formed is not critical. At elevated temperatures there is a tendency towards loss of ammonia from the solution. Temperatures below room temperature are not convenient. Thus, usually the temperature would lie within the range from about 80 to about 140° F., in order to obtain an optimum reaction rate with a minimum loss of ammonia.

The following examples illustrate, in the opinion of the inventor, the best mode of preparing the copper liquor of the invention.

EXAMPLES 1 AND 2

In this experiment, a preparation using a cupric acetate "heel" is compared with the preparation of a copper liquor in which no "heel" was employed. The amounts of the ingredients are given in Table I. The water and ammonia were combined in separate mixing vessels with the acetic acid and copper shot. To one mixing vessel cupric acetae was added (Example 1). No cupric acetate was added to the other vessel (Example 2). Air-blowing was then begun at the rate indicated in the table, and stirring continued throughout the reaction at a circulation rate of 9.5 cc. per minute. Temperature during the mixing ranged from 80 to 100° F., and during the reaction from 90 to 140° F.

Progress in the preparation of the liquor was followed by analysis of the cupric copper present in solution. In the presence of the cupric acetate "heel," the cupric copper and total copper reached the minimum requirements, i.e. 27.7 g./l. and 110 g./l. respectively, by the end of 30 hours. The minimum copper (total) concentration was not reached in the case of copper liquor prepared without a "heel" until after 92 hours, showing that the use of the "heel" reduced the preparation time by two-thirds.

*Table I*

| Copper Liquor Composition | Example No. | |
| --- | --- | --- |
|  | 1 | 2 |
|  | With Heel | No Heel |
|  | G. | G. |
| Water | 2,288 | 2,850 |
| Ammonia | 451 | [1]451 |
| Acetic Acid | 573 | 679 |
| Copper Shot | 388 | 445 |
| Cupric acetate | 180 | 0 |

| Reaction Conditions | Example No. | |
| --- | --- | --- |
|  | 1 | 2 |
|  | With Heel | No Heel |
| Air rate _____ c.f.h__ | 0.1-02 | 0.1-0.2 |
| Cu solutions circulation rate ___ cc./min__ | 9.5 | 9.5 |
| Temperature: |  |  |
| in make-up _____ ° F__ | 80-100 | 80-100 |
| in reaction _____ ° F__ | 90-100 | 120-140 |

[Copper liquor analysis (g./l.).]

| Time (Hrs.) | Cupric Copper—Example No. | | Total Cuprous and Cupric Copper—Example No. | | Ammonia—Example No. | |
| --- | --- | --- | --- | --- | --- | --- |
|  | 1 | 2 | 1 | 2 | 1 | 2 |
|  | With Heel | No Heel | With Heel | No Heel | With Heel | No Heel |
| 0 | 17.0 | 0 | 17.1 | 0 | 123.5 |  |
| 3.8 | 18.4 | 2.7 | 27.9 | 4.7 |  | 106 |
| 5.7 | 14.0 |  | 34.6 |  | 122 |  |
| 15 |  | 7.0 |  | 18.7 |  | 105 |
| 22.5 | 31.2 |  | 95.8 |  | 121 |  |
| 24 |  | 10.0 |  | 31.4 |  | 108 |
| 30 | 27.7 |  | 110 |  | 121 |  |
| 40 |  | 33.6 |  | 69.6 |  | 106 |
| 56 |  | 24.5 |  | 83.4 |  | 109 |
| 70 |  | 21.5 |  | 95.2 |  | 111 |
| 76 |  | 25.3 |  | 100.3 |  |  |
| 92 |  | 43.8 |  | 108.5 |  |  |

[1] More added during experiment.

No appreciable ammonia losses were encountered in the course of the preparation, and no deposition of metallic copper or corrosion of the steel mixing vessel occurred.

The copper liquor of the invention is used to treat crude synthesis gas in accordance with conventional procedures, known to those skilled in this art. The Haber-Basch process is a typical synthetic ammonia process in which the copper liquor of the invention can be used. Usually, the copper liquor is used in a cyclic, continuous process involving CO and $CO_2$ absorption, followed by liquor regeneration.

The absorption step is carried out as follows: The synthesis gas is passed from the bottom to the top of an absorption tower, while cold copper liquor, chilled to 32° F., is passed countercurrently from the top to the bottom. Most of the carbon monoxide and carbon dioxide is removed in this tower. A second tower having the same flow pattern can be used in series with the first to ensure complete removal of the carbon monoxide and carbon dioxide, down to 5 p.p.m. The gases then are conducted to the catalyst for conversion to ammonia.

The spent copper liquor, containing the carbon monoxide in the form of the cuprous carbon monoxide complex is regenerated as follows: It is first passed to a stripper. Then, the liquid passes downwardly through a cold region packed with porcelain rings, countercurrently to an upflow of stripped gases containing ammonia, carbon monoxide, and carbon dioxide. The stripped liquor is removed at the bottom of the tower, and passed up through two heated zones held at about 170° F., during which most of the remaining carbon monoxide and carbon dioxide plus some of the ammonia are stripped out. It is then conducted to a regenerator drum in which ammonia make-up is added. The copper is replenished if necessary, as stated below. The copper solution is then water-cooled and refrigerated to the absorption temperature, filtered, and returned to the absorption tower.

The absorption towers are run at 1700 p.s.i.g., while the regenerator is essentially an atmospheric pressure operation, so that it is necessary to step down the pressure after absorption, and to compress the liquor prior to its readmission to the absorption towers.

The total copper is kept above 10 g./l. Whenever it falls below this value, copper is added by making more copper liquor in the manner described. In the same way, the cupric content is maintained at about 20 g./l. Too low a cupric level results in copper deposition, while too high a level reduces the effective capacity of the solution for absorption of carbon monoxide. Cupric level can be measured continuously by a photometer, as described in Analytical Chemistry, 17, 283 (1945).

The following example illustrates a preferred mode of employing the copper liquor prepared by the process of the invention.

EXAMPLE 3

Synthesis gas was converted to ammonia by the Haber-Basch process. The synthesis gas was first prepared by steam-reforming methane at 5 to 7 p.s.i.g. and 1260° F. using a nickel catalyst, to yield carbon monoxide and hydrogen. The residual methane was then burned in air to produce carbon monoxide and water. The mixture was shifted in the water gas equilibrium to produce a mixture consisting essentially of nitrogen, hydrogen, and carbon dioxide, together with carbon monoxide in a concentration of about 20,000 p.p.m. unreacted methane and some argon.

The crude synthesis gas was compressed to about 270 p.s.i.g. and passed to the purification system. The carbon dioxide was removed by scrubbing with water at 270 lbs. pressure. The resulting gas contained less than 1% carbon dioxide. The remaining carbon dioxide and the carbon monoxide plus a small amount of oxygen picked up in the water scrubbing were removed by scrubbing with the copper liquor prepared in accordance with Example 1. This was carried out at 1700 p.s.i.g. and 40° F. Carbon dioxide and carbon monoxide each were removed to below 5 p.p.m.

The purified synthesis gas obtained from the copper liquor scrubbing was further compressed to 4500 p.s.i.g. and brought to a temperature of 900 to 1000° F., at which it was conducted to the iron catalyst to obtain a 15 to 20% conversion per pass to ammonia. The iron catalyst used contained potassium oxide and alumina as promoters.

The copper liquor was regenerated in a scrubber through which it was passed at 40° F. at atmospheric pressure and then conducted through two heated zones held at about 170° F. during which most of the carbon monoxide and carbon dioxide plus some of the ammonia were stripped out. It was then passed to a reservoir in which ammonia was added to bring the ammonia concentration back up to the normal 120 g./l., refrigerated to 32° F., filtered and returned to the absorption towers. The copper concentration did not require replenishment, as judged by a photometer in accord with Analytical Chemistry, 17, 283 (1945).

In the specification and claims all percentages are by weight.

I claim:

1. In the process for preparing copper liquor from metallic copper for use in the scrubbing of hydrogen-nitrogen gas mixtures used in ammonia synthesis to remove carbon monoxide and carbon dioxide therefrom, the said copper liquor comprising cuprous and cupric copper ions and ammonia, the improvement which comprises initiating the dissolution of the metallic copper in aqueous ammonia solution in the presence of added copper acetate in an amount within the range from about 1 to about 20% of the total copper content of the final solution.

2. A process in accordance with claim 1 in which the amount of copper acetate lies within the range from about 0.1 to about 5% by weight of the aqueous ammonia solution.

3. A process in accordance with claim 1 in which the copper acetate is cupric acetate.

4. A process in accordance with claim 1 in which the copper acetate is cuprous acetate.

References Cited in the file of this patent

UNITED STATES PATENTS

| | | |
|---|---|---|
| 1,050,678 | Moreno | Jan. 14, 1913 |
| 1,694,594 | Halvorsen | Dec. 11, 1928 |
| 2,383,784 | Fleer | Aug. 28, 1945 |

FOREIGN PATENTS

| | | |
|---|---|---|
| 120,546 | Great Britain | Jan. 15, 1920 |